(12) United States Patent
He et al.

(10) Patent No.: US 11,595,817 B2
(45) Date of Patent: Feb. 28, 2023

(54) AUTHENTICATION METHOD, DEVICE, AND SYSTEM

(71) Applicant: HUAWEI TECHNOLOGIES CO., LTD., Guangdong (CN)

(72) Inventors: Chengdong He, Shenzhen (CN); Hua Li, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 250 days.

(21) Appl. No.: 16/834,185

(22) Filed: Mar. 30, 2020

(65) Prior Publication Data
US 2020/0228982 A1 Jul. 16, 2020

Related U.S. Application Data

(63) Continuation of application No. PCT/CN2018/114461, filed on Nov. 8, 2018.

(30) Foreign Application Priority Data

Nov. 17, 2017 (CN) .......................... 201711148923.1

(51) Int. Cl.
*G06F 17/00* (2019.01)
*H04L 29/06* (2006.01)
(Continued)

(52) U.S. Cl.
CPC .......... *H04W 12/06* (2013.01); *H04W 12/04* (2013.01); *H04W 12/37* (2021.01)

(58) Field of Classification Search
CPC ..... H04W 12/06; H04W 12/04; H04W 12/37; H04W 12/40; H04W 12/062; H04L 9/32
(Continued)

(56) References Cited

U.S. PATENT DOCUMENTS

2002/0044552 A1 4/2002 Vialen et al.
2008/0064369 A1 3/2008 Xie et al.
(Continued)

FOREIGN PATENT DOCUMENTS

CN 1815954 A 8/2006
CN 1852553 A 10/2006
(Continued)

OTHER PUBLICATIONS

J. Arkko et al.,"Improved Extensible Authentication Protocol Method for 3rd Generation Authentication and Key Agreement (EAP-AKA)",Request for Comments: 5448,Network Working Group,May 2009,total 29 pages.
3GPP TS 29.509 V0.2.0 (Oct. 2017);3rd Generation Partnership Project;Technical Specification Group Core Network and Terminals;5G System; Authentication Server Services;Stage 3(Release 15),total 17 pages.
(Continued)

*Primary Examiner* — Jeffrey C Pwu
*Assistant Examiner* — Samuel Ambaye
(74) *Attorney, Agent, or Firm* — Womble Bond Dickinson (US) LLP

(57) ABSTRACT

Embodiments of this application provide an authentication method, device, and system, to resolve problems of wastage of performance and memory resources that may be caused by remaining n−1 unused authentication vectors (AVs). The method includes: receiving, by an authentication entity, n first authentication vectors from a unified data management entity, where n is a positive integer; generating, by the authentication entity, n second authentication vectors based on the n first authentication vectors; sending, by the authentication entity, one of the n second authentication vectors to a security anchor function entity; receiving, by the authentication entity, an authentication confirmation request from the security anchor function entity, and performing authentication confirmation on the terminal according to the authentication confirmation request; and sending, by the authentication entity, the other n−1 unused second authen-
(Continued)

tication vectors in the n second authentication vectors to the security anchor function entity when the authentication confirmation succeeds.

17 Claims, 5 Drawing Sheets

(51) Int. Cl.
*H04W 12/06* (2021.01)
*H04W 12/04* (2021.01)
*H04W 12/37* (2021.01)

(58) Field of Classification Search
USPC .............................................................. 726/1
See application file for complete search history.

(56) References Cited

U.S. PATENT DOCUMENTS

| | | | |
|---|---|---|---|
| 2011/0265146 A1 | 10/2011 | He | |
| 2012/0265990 A1* | 10/2012 | Liu | H04W 12/069 713/168 |
| 2013/0035067 A1* | 2/2013 | Zhang | H04W 12/06 455/411 |
| 2018/0184297 A1* | 6/2018 | Mohamed | H04W 36/14 |
| 2019/0261178 A1* | 8/2019 | Rajadurai | H04W 12/069 |

FOREIGN PATENT DOCUMENTS

| | | | |
|---|---|---|---|
| CN | 101772020 A | 7/2010 | |
| CN | 101998395 A | 3/2011 | |
| CN | 106921965 A | 7/2017 | |
| EP | 1169880 A1 | 1/2002 | |
| WO | WO-2008036961 A2 * | 3/2008 | ........... H04L 63/102 |
| WO | WO-2016086355 A1 * | 6/2016 | ............ H04W 12/04 |
| WO | 2017092813 A1 | 6/2017 | |

OTHER PUBLICATIONS

S3-172569 KPN,"Rewriting Clause 6.1.2 and 6.1.3 in normative language and adding Annex A",3GPP TSG SA WG3 (Security) Meeting #88Bis Adhoc,Oct. 9-13, 2017, Singapore,total 8 pages.
3GPP TR 33.899 V1.3.0 (Aug. 2017),3rd Generation Partnership Project;Technical Specification Group Services and System Aspects;Study on the security aspects of the next generation system(Release 14),total 604 pages.
S3-172224 KPN,"Rewriting Clause 6.1.2 and 6.1.3 in normative language and adding Annex A",3GPP TSG SA WG3 (Security) Meeting #88Bis Adhoc,Oct. 9-13, 2017, Singapore,total 8 pages.
3GPP TS 33.501 V0.4.0 (Oct. 2017),3rd Generation Partnership Project;Technical Specification Group Services and System Aspects;Security Architecture and Procedures for 5G System (Release 15),dated Nov. 6, 2017,total 70 pages.
3GPP TS 23.501 V1.5.0 (Nov. 2017),3rd Generation Partnership Project;Technical Specification Group Services and System Aspects-;System Architecture for the 5G System;Stage 2(Release 15),dated Nov. 13, 2017,total 170 pages.
S3-172578 Huawei, Hisilicon,"Providing details on the authentication vector and calculation of keys",3GPP TSG SA WG3 (Security) Meeting #88Bis Adhoc,Oct. 9-13, 2017, Singapore,total 5 pages.
S3-171990 Nokia,"More than one authentication vector may be sent to SEAF",3GPP TSG SA WG3 (Security) Meeting #88,Aug. 7-11, 2017, Dali, China,total 4 pages.
S3-171803 Huawei / HiSilicon,"EPS-AKA* procedure, pCR for option 1",3GPP TSG SA WG3 (Security) Meeting #88,Aug. 7-11, 2017, Dali, China,total 3 pages.
3GPP TS 33.102 V14.1.0 (Mar. 2017),3rd Generation Partnership Project;Technical Specification Group Services and System Aspects;3G Security;Security architecture(Release 14),total 77 pages.
3GPP TS 33.401 V15.1.0 (Sep. 2017),3rd Generation Partnership Project;Technical Specification Group Services and System Aspects;3GPP System Architecture Evolution (SAE);Security architecture(Release 15),total 161 pages.

* cited by examiner

AUTHENTICATION METHOD, DEVICE, AND SYSTEM

CROSS-REFERENCE TO RELATED APPLICATIONS

This application is a continuation of International Application No. PCT/CN2018/114461, filed on Nov. 8, 2018, which claims priority to Chinese Patent Application No. 201711148923.1, filed on Nov. 17, 2017. The disclosures of the aforementioned applications are hereby incorporated by reference in their entireties.

TECHNICAL FIELD

This application relates to the field of communications technologies, and in particular, to an authentication method, device, and system.

BACKGROUND

In an authentication procedure of a user registration process described in a 3rd generation partnership project (3GPP) technical standard (TS) 33.501 v0.40, if an authentication algorithm selected by a unified data management (UDM) entity in a home network is 5th generation-authentication and key agreement (5G-AKA), the UDM entity may generate n authentication vectors (AV) at a time, where n is a positive integer. Further, an authentication server function (AUSF) entity in the home network may receive the n AVs from the UDM entity. However, for security anchor function (SEAF) entities in some visited networks with relatively low trust levels, the AUSF entity may send only one AV to the SEAF entities, and when n is greater than 1, how to handle remaining n−1 unused AVs is not explicitly stated in the prior art. If the remaining n−1 unused AVs are all stored on the AUSF entity, the following problems may arise:

1. Processing performance of the AUSF entity and the UDM entity may be affected to some extent.

2. Storing the remaining n−1 unused AVs on the AUSF entity occupies memory of the AUSF entity. For example, if n is equal to 10, because an AV includes a random number (RAND), an authentication token (AUTN), an expected response (XRES*), and a key Kasme*, the AUTN and the RAND each occupies 16 bytes, the XRES* occupies 16 bytes, and the Kasme* occupies 32 bytes, for a user, 9×(16+16+16+32)=800 bytes are occupied if the n−1 AVs are stored on the AUSF entity, and for 10 million users, memory of 10 million×800=7.5 GB is occupied if the n−1 AVs are stored on the AUSF entity.

As a result, performance and memory resource waste that may be caused by remaining n−1 unused AVs are technical problems that need to be urgently resolved.

SUMMARY

Embodiments of this application provide an authentication method, device, and system, to resolve at least problems of performance and memory resource waste that may be caused by remaining n−1 unused AVs.

To achieve the foregoing objective, the embodiments of this application provide the following technical solutions.

According to a first aspect, an authentication method is provided, where the method includes: receiving, by an authentication entity, n first authentication vectors from a unified data management entity, where n is a positive integer; generating, by the authentication entity, n second authentication vectors based on the n first authentication vectors; sending, by the authentication entity, one of the n second authentication vectors to a security anchor function entity; receiving, by the authentication entity, an authentication confirmation request from the security anchor function entity, and performing authentication confirmation on the terminal according to the authentication confirmation request; and sending, by the authentication entity, the other n−1 unused second authentication vectors in the n second authentication vectors to the security anchor function entity when the authentication confirmation succeeds. Based on this solution, not only prior-art problems of performance and memory resource waste that may be caused by remaining n−1 unused first authentication vectors can be resolved, thereby improving efficiency of using the first authentication vector, but also failure to authenticate the terminal that is caused by failure of a link between the security anchor function entity and the authentication entity can be reduced, thereby improving reliability of an authentication result. For an analysis of a related technical effect, refer to the following method embodiments. Details are not described herein again.

In one embodiment, the method further includes: sending, by the authentication entity, an authentication confirmation identifier to the security anchor function entity, where the authentication confirmation identifier is used to indicate that authentication confirmation is required. In this case, after successfully authenticating the terminal subsequently, the SEAF entity may send the authentication confirmation request to the AUSF entity based on the authentication confirmation identifier, so that the AUSF entity further performs authentication confirmation on the terminal.

In one embodiment, the method further includes: determining, by the authentication entity, that authentication confirmation is required.

In one embodiment, the determining, by the authentication entity, that authentication confirmation is required includes: receiving, by the authentication entity, the authentication confirmation identifier from the unified data management entity, where the authentication confirmation identifier is used to indicate that authentication confirmation is required. In other words, whether authentication confirmation is required may be determined by the unified data management entity, so that a billing discrepancy between a visited network and a home network or a denial-of-service attack that may exist in the prior art can be avoided, thereby improving network security. For an analysis of a related technical effect, refer to the following method embodiments.

In one embodiment, the determining, by the authentication entity, that authentication confirmation is required includes: determining, by the authentication entity according to a locally configured security policy, that authentication confirmation is required.

In one embodiment, the authentication confirmation request carries a response RES* and a corresponding random number RAND; and the performing, by the authentication entity, authentication confirmation on the terminal according to the authentication confirmation request includes: searching, by the authentication entity, for a corresponding XRES* based on the RAND, and performing authentication confirmation on the terminal by comparing the RES* with the XRES*. In this manner, after the authentication entity receives the authentication confirmation request from the security anchor function entity, because the XRES* corresponding to the RES* can be quickly found, the following problem in the prior art can be resolved: During authentication confirmation, the authentication entity cannot determine an authentication vector from a plurality of first authentication vectors previously received by the authentication entity from the unified data management entity, and therefore cannot use an XRES* in the authentication vector to compare with the received RES*, and as a result, processing performance of the AUSF entity is affected. Therefore, quick authentication confirmation can be performed on the terminal.

According to a second aspect, an authentication method is provided, where the method includes: generating, by a unified data management entity, n first authentication vectors, where n is a positive integer; sending, by the unified data management entity, the n first authentication vectors to an authentication entity; receiving, by the authentication entity, the n first authentication vectors from the unified data management entity, and generating n second authentication vectors based on the n first authentication vectors; sending, by the authentication entity, one of the n second authentication vectors to a security anchor function entity; receiving, by the authentication entity, an authentication confirmation request from the security anchor function entity, and performing authentication confirmation on the terminal according to the authentication confirmation request; and sending, by the authentication entity, the other n−1 unused second authentication vectors in the n second authentication vectors to the security anchor function entity when the authentication confirmation succeeds. For a technical effect brought by the second aspect, refer to the technical effect brought by the first aspect. Details are not described herein again.

In one embodiment, the generating, by a unified data management entity, n first authentication vectors includes: generating, by the unified data management entity, the n first authentication vectors based on a default quantity n of authentication vectors that is locally configured. In this embodiment of this application, the unified data management entity may generate a corresponding quantity of first authentication vectors based on an authentication algorithm, unlike in the prior art in which a quantity of authentication vectors is carried in an authentication information request sent by the authentication entity to the unified data entity. Therefore, inconsistency between the quantity of first authentication vectors requested by the authentication entity and a quantity of first authentication vectors generated by the unified data entity in the prior art can be avoided. For example, if the authentication entity requests a plurality of first authentication vectors, and the unified data management entity generates only one first authentication vector at a time based on a selected authentication algorithm, a requirement of a quantity of first authentication vectors requested by the authentication entity cannot be satisfied.

In one embodiment, the method further includes: determining, by the unified data management entity according to a locally configured security policy, that authentication confirmation is required; sending, by the unified data management entity, an authentication confirmation identifier to the authentication entity, where the authentication confirmation identifier is used to indicate that authentication confirmation is required; and receiving, by the authentication entity, the authentication confirmation identifier from the unified data management entity, and sending the authentication confirmation identifier to the security anchor function entity.

In one embodiment, the determining, by the unified data management entity according to a locally configured security policy, that authentication confirmation is required includes: determining, by the unified data management entity based on an identifier of a service network in which the security anchor function entity is located and a security policy of the service network in the locally configured security policy, that authentication confirmation is required. In other words, whether authentication confirmation is required may be determined by the unified data management entity, so that a billing discrepancy between a visited network and a home network or a denial-of-service attack that may exist in the prior art can be avoided, thereby improving network security. For an analysis of a related technical effect, refer to the following method embodiments. Details are not described herein again.

According to a third aspect, an authentication method is provided, where the method includes: determining, by a unified data management entity according to a locally configured security policy, that authentication confirmation is required; sending, by the unified data management entity, an authentication information answer to an authentication entity, where the authentication information answer carries an authentication confirmation identifier, and the authentication confirmation identifier is used to indicate that authentication confirmation is required; receiving, by the authentication entity, the authentication information answer from the unified data entity; sending, by the authentication entity, an authentication initiation answer to a security anchor function entity, where the authentication initiation answer carries the authentication confirmation identifier; and receiving, by the authentication entity, an authentication confirmation request from the security anchor function entity, and performing authentication confirmation on the terminal according to the authentication confirmation request. Based on this solution, a billing discrepancy between a visited network and a home network or a denial-of-service attack that may exist in the prior art can be avoided, thereby improving network security. For an analysis of a related technical effect, refer to the following method embodiments. Details are not described herein again.

In one embodiment, the method further includes: generating, by the unified data management entity, n first authentication vectors. Correspondingly, the authentication information answer further carries the n first authentication vectors. The method further includes: generating, by the authentication entity, n second authentication vectors based on the n first authentication vectors. Correspondingly, the authentication initiation answer further carries one of the n second authentication vectors. After the receiving, by the authentication entity, an authentication confirmation request from the security anchor function entity, the method further includes: sending, by the authentication entity, the other n−1 unused second authentication vectors in the n second authentication vectors to the security anchor function entity when the authentication confirmation succeeds. Based on this solution, not only prior-art problems of performance and memory resource waste that may be caused by remaining n−1 unused first authentication vectors can be resolved, thereby improving efficiency of using the first authentication vector, but also failure to authenticate the terminal that is caused by failure of a link between the security anchor function entity and the authentication entity can be reduced, thereby improving reliability of an authentication result. For an analysis of a related technical effect, refer to the following method embodiments. Details are not described herein again.

In one embodiment, the method further includes: generating, by the unified data management entity, n first authentication vectors. Correspondingly, the authentication information answer further carries the n first authentication vectors. The method further includes: generating, by the authentication entity, n second authentication vectors based on the n first authentication vectors. Correspondingly, the authentication initiation answer further carries the n second authentication vectors. Based on this solution, not only prior-art problems of performance and memory resource waste that may be caused by remaining n−1 unused first authentication vectors can be resolved, thereby improving efficiency of using the first authentication vector, but also failure to authenticate the terminal that is caused by failure of a link between the security anchor function entity and the authentication entity can be reduced, thereby improving reliability of an authentication result. For an analysis of a related technical effect, refer to the following method embodiments. Details are not described herein again.

In some embodiments, after the performing, by the authentication entity, authentication confirmation on a terminal according to the authentication confirmation request, the method further includes: sending, by the authentication entity, an authentication confirmation failure indication to the security anchor function entity when the authentication confirmation fails, where the authentication confirmation failure indication is used to indicate that the authentication confirmation fails. In this way, the security anchor function entity can learn of an authentication confirmation result in a timely manner.

In some embodiments, after the performing, by the authentication entity, authentication confirmation on a terminal according to the authentication confirmation request, the method further includes: sending, by the authentication entity, an authentication confirmation success indication to the security anchor function entity when the authentication confirmation succeeds, where the authentication confirmation success indication is used to indicate that the authentication confirmation succeeds. In this way, the security anchor function entity can learn of an authentication confirmation result in a timely manner.

In some embodiments, after the performing, by the authentication entity, authentication confirmation on a terminal according to the authentication confirmation request, the method further includes: sending, by the authentication entity, the authentication confirmation identifier to the security anchor function entity when the authentication confirmation succeeds, where the authentication confirmation identifier is used to indicate that authentication confirmation is required.

According to a fourth aspect, an authentication method is provided, where the authentication method includes: generating, by a unified data management entity, n first authentication vectors according to a locally configured security policy, where n is a positive integer; sending, by the unified data management entity, the n first authentication vectors to an authentication entity; receiving, by the authentication entity, the n first authentication vectors from the unified data entity, and generating n second authentication vectors based on the n first authentication vectors; and sending, by the authentication entity, the n second authentication vectors to the security anchor function entity. Based on the method, not only prior-art problems of performance and memory resource waste that may be caused by remaining n−1 unused first authentication vectors can be resolved, thereby improving efficiency of using the first authentication vector, but also failure to authenticate a terminal that is caused by failure of a link between the security anchor function entity and the authentication entity can be reduced, thereby improving reliability of an authentication result. In addition, inconsistency between a quantity of first authentication vectors requested by the authentication entity and a quantity of first authentication vectors actually generated by the unified data management entity in the prior art can be avoided. For an analysis of a related technical effect, refer to the following method embodiments. Details are not described herein again.

In one embodiment, the method further includes: receiving, by the authentication entity, an authentication confirmation request from the security anchor function entity, and performing authentication confirmation on the terminal according to the authentication confirmation request; and sending, by the authentication entity, an authentication confirmation failure indication to the security anchor function entity when the authentication confirmation fails, where the authentication confirmation failure indication is used to indicate that the authentication confirmation fails. In this way, the security anchor function entity can learn of an authentication confirmation result in a timely manner.

In one embodiment, the method further includes: receiving, by the authentication entity, an authentication confirmation request from the security anchor function entity, and performing authentication confirmation on the terminal according to the authentication confirmation request; and sending, by the authentication entity, an authentication confirmation success indication to the security anchor function entity when the authentication confirmation succeeds, where the authentication confirmation success indication is used to indicate that the authentication confirmation succeeds.

In one embodiment, the generating, by a unified data management entity, n first authentication vectors according to a locally configured security policy includes: generating, by the unified data management entity, the n first authentication vectors based on an identifier of a service network in which the security anchor function entity is located and a security policy of the service network in the locally configured security policy.

According to a fifth aspect, an authentication entity is provided, where the authentication entity has a function of implementing the method in the first aspect. The function may be implemented by hardware, or may be implemented by hardware by executing corresponding software. The hardware or software includes one or more modules corresponding to the function.

According to a sixth aspect, an authentication entity is provided and includes a processor and a storage, where the storage is configured to store a computer executable instruction, and when the authentication entity runs, the processor executes the computer executable instruction stored in the storage, so that the authentication entity performs the authentication method in any one of the foregoing possible designs of the first aspect.

According to a seventh aspect, a computer-readable storage medium is provided, where the computer-readable storage medium stores an instruction, and when the instruction runs on a computer, the computer may perform the authentication method in any one of the foregoing possible designs of the first aspect.

According to an eighth aspect, a computer program product that includes an instruction is provided, where when the instruction runs on a computer, the computer may perform the authentication method in any one of the foregoing possible designs of the first aspect.

According to a ninth aspect, a chip system is provided, where the chip system includes a processor, configured to support an authentication entity in implementing the function in the foregoing aspect, for example, generating n second authentication vectors based on n first authentication vectors. In one embodiment, the chip system further includes a storage. The storage is configured to store a program instruction and data required by the authentication entity. The chip system may include a chip, or may include a chip and another discrete device.

For technical effects brought by any design manner of the fifth aspect to the ninth aspect, refer to technical effects brought by different design manners of the first aspect. Details are not described herein again.

According to a tenth aspect, an authentication system is provided, where the authentication system includes a unified data management entity and an authentication entity, where the unified data management entity is configured to generate n first authentication vectors, where n is a positive integer; the unified data management entity is further configured to send the n first authentication vectors to the authentication entity; the authentication entity is configured to: receive the n first authentication vectors from the unified data management entity, and generate n second authentication vectors based on the n first authentication vectors; the authentication entity is further configured to send one of the n second authentication vectors to a security anchor function entity; the authentication entity is further configured to: receive an authentication confirmation request from the security anchor function entity, and perform authentication confirmation on the terminal according to the authentication confirmation request; and the authentication entity is further configured to send the other n−1 unused second authentication vectors in the n second authentication vectors to the security anchor function entity when the authentication confirmation succeeds. For a technical effect brought by the tenth aspect, refer to the technical effect brought by the second aspect. Details are not described herein again.

According to an eleventh aspect, an authentication system is provided, where the authentication system includes a unified data management entity and an authentication entity, where the unified data management entity is configured to determine, according to a locally configured security policy, that authentication confirmation is required; the unified data management entity is further configured to send an authentication information answer to the authentication entity, where the authentication information answer carries an authentication confirmation identifier, and the authentication confirmation identifier is used to indicate that authentication confirmation is required; the authentication entity is configured to receive the authentication information answer from the unified data entity; the authentication entity is further configured to send an authentication initiation answer to a security anchor function entity, where the authentication initiation answer carries the authentication confirmation identifier; and the authentication entity is further configured to: receive an authentication confirmation request from the security anchor function entity, and perform authentication confirmation on the terminal according to the authentication confirmation request. For a technical effect brought by the eleventh aspect, refer to the technical effect brought by the third aspect. Details are not described herein again.

These aspects or other aspects of this application are clearer and more comprehensible in descriptions of the following embodiments.

DESCRIPTION OF EMBODIMENTS

The following describes the technical solutions in the embodiments of this application with reference to the accompanying drawings in the embodiments of this application. In the description of this application, "/" means "or" unless otherwise specified. For example, AB may represent A or B. In this specification, "and/or" describes only an association relationship for describing associated objects and represents that three relationships may exist. For example, A and/or B may represent the following three cases: Only A exists, both A and B exist, and only B exists. In addition, in the description of this application, the term "a plurality of" means two or more unless otherwise specified. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not mean being definitely different either. This is not specifically limited in the embodiments of this application.

Network architectures and service scenarios described in the embodiments of this application are intended to more clearly describe the technical solutions in the embodiments of this application, but are not intended to limit the technical solutions provided in the embodiments of this application. A person of ordinary skill in the art may know that as the network architectures evolve and a new service scenario emerges, the technical solutions provided in the embodiments of this application are also applicable to a similar technical problem.

Figure 1:
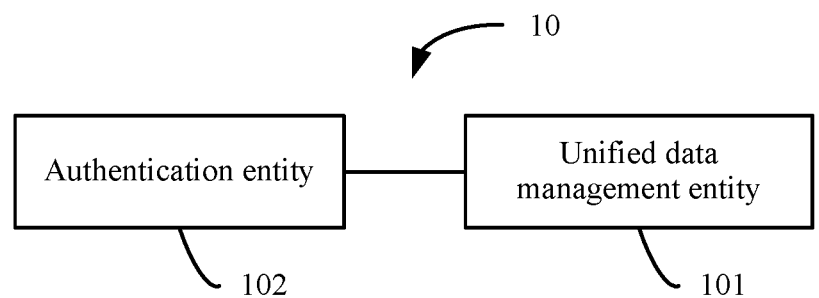
FIG. 1 is a schematic architectural diagram of an authentication system according to an embodiment of this application.

FIG. 1 shows an authentication system 10 according to an embodiment of this application. The authentication system 10 includes a unified data management entity 101 and an authentication entity 102. The unified data management entity 101 may directly communicate with the authentication entity 102, or may communicate with the authentication entity 102 through forwarding by another device. This is not specifically limited in this embodiment of this application.

In a possible implementation, the unified data management entity 101 is configured to: generate n first authentication vectors and send the n first authentication vectors to the authentication entity 102, where n is a positive integer.

The authentication entity 102 is configured to: receive the n first authentication vectors from the unified data entity 101, and generate n second authentication vectors based on the n first authentication vectors.

The authentication entity 102 is further configured to send one of the n second authentication vectors to a security anchor function entity.

The authentication entity 102 is further configured to: receive an authentication confirmation request from the security anchor function entity, and perform authentication confirmation on a terminal according to the authentication confirmation request; and send the other n−1 unused second authentication vectors in the n second authentication vectors to the security anchor function entity when the authentication confirmation succeeds.

The first authentication vector in this embodiment of this application may include a RAND, an AUTN, an XRES*, and a Kasme*. A second authentication vector corresponding to the first authentication vector may include the RAND, the AUTN, a hash XRES* (HXRES*), and the Kasme*. The description is provided herein, and is not described below again. The HXRES* is determined based on the RAND and the XRES*. For details, refer to an existing implementation. Details are not described in this embodiment of this application.

In the authentication system provided in this embodiment of this application, after generating the n second authentication vectors based on the received n first authentication vectors, the authentication entity sends one of the n second authentication vectors to the security anchor function entity, and sends the other n−1 unused second authentication vectors in the n second authentication vectors to the security anchor function entity after receiving the authentication confirmation request from the security anchor function entity and successfully performing authentication confirmation on the terminal according to the authentication confirmation request. In this way, the following cases can be avoided: 1. Each time a security anchor function entity in a service network attempts to authenticate the terminal again, the security anchor function entity needs to request a first authentication vector from an authentication entity in a home network, thereby affecting processing performance of the authentication entity. 2. The authentication entity in the home network does not know when a security anchor function entity in a visited network initiates authentication again. For example, the terminal has left the visited network in which the security anchor function entity is located, or there is still a long time before the security anchor function entity initiates authentication again. In this case, if an aging deletion mechanism is used, when the security anchor function entity requests the first authentication vector from the authentication entity again, because the first authentication vector has aged and been deleted, the unified data management entity further needs to regenerate a required first authentication vector, thereby affecting processing performance of the unified data management entity. 3. When the security anchor function entity requests the first authentication vector from the authentication entity again, the first authentication vector cannot be obtained due to failure of a link between the security anchor function entity and the authentication entity, and as a result, authentication performed on the terminal fails. In addition, a prior-art problem of wasting memory resources of the authentication entity that may be caused by remaining n−1 unused first authentication vectors can be resolved. In other words, based on this solution, not only prior-art problems of performance and memory resource waste that may be caused by remaining n−1 unused first authentication vectors can be resolved, thereby improving efficiency of using the first authentication vector, but also failure to authenticate the terminal that is caused by failure of a link between the security anchor function entity and the authentication entity can be reduced, thereby improving reliability of an authentication result.

In another possible implementation, the unified data management entity 101 is configured to: generate n first authentication vectors according to a locally configured security policy and send the n first authentication vectors to the authentication entity 102, where n is a positive integer.

The authentication entity 102 is configured to: receive the n first authentication vectors from the unified data entity 101, generate n second authentication vectors based on the n first authentication vectors, and then send the n second authentication vectors to a security anchor function entity.

In one embodiment, in this embodiment of this application, the locally configured security policy may include a security policy list of different service networks, and the security policy list may include a security policy of a service network in which the security anchor function entity that currently serves a terminal is located. This is not specifically limited in this embodiment of this application.

In this embodiment of this application, the security policy of the service network may specifically include a trust level of the service network, and the trust level of the service network may include, for example, a high trust level or a low trust level. The high trust level indicates that the service network is trusted, and the low trust level indicates that the service network is not trusted. The description is provided herein, and is not described below again.

The service network in this embodiment of this application may be a home network, for example, a home public land mobile network (HPLMN) in a non-roaming scenario of the terminal. Alternatively, the service network may be a visited network, for example, a visited public land mobile network (VPLMN) in a roaming scenario of the terminal. This is not specifically limited in this embodiment of this application. The description is provided herein, and is not described below again.

For example, the locally configured security policy may be shown in Table 1.

TABLE 1

| Service network | Security policy |
|---|---|
| PLMN 1 | High trust level |
| PLMN 2 | High trust level |
| PLMN 3 | Low trust level |
| PLMN 4 | High trust level |
| . . . | . . . |

It should be noted that Table 1 provides only a list form of the locally configured security policy as an example. Certainly, the locally configured security policy may be in another form, for example, a text form. This is not specifically limited in this embodiment of this application.

In the authentication system provided in this embodiment of this application, the authentication entity generates the n first authentication vectors according to the locally configured security policy and sends the n first authentication vectors to the authentication entity. After generating the n second authentication vectors based on the n first authentication vectors, the authentication entity sends the n second authentication vectors to the security anchor function entity. For example, in the locally configured security policy, the security policy of the service network in which the security anchor function entity is located has a high trust level, and a plurality of first authentication vectors may be generated. In this case, after obtaining a plurality of second authentication vectors, the authentication entity may send the plurality of second authentication vectors to the security anchor function entity. Alternatively, in the locally configured security policy, the security policy of the service network in which the security anchor function entity is located has a low trust level, and one first authentication vector may be generated. In this case, after obtaining one second authentication vector, the authentication entity may send the second authentication vector to the security anchor function entity. In this way, not only prior-art problems of performance and memory resource waste that may be caused by remaining n−1 unused first authentication vectors can be resolved, thereby improving efficiency of using the first authentication vector, but also failure to authenticate the terminal that is caused by failure of a link between the security anchor function entity and the authentication entity can be reduced, thereby improving reliability of an authentication result. In addition, the unified data management entity generates the n first authentication vectors according to the locally configured security policy, unlike in the prior art in which a quantity of authentication vectors is carried in an authentication information request sent by the authentication entity to the unified data management entity. Therefore, not only the authentication entity can send the n second authentication vectors to the security anchor function entity in a subsequent process, but also inconsistency between the quantity of first authentication vectors requested by the authentication entity and a quantity of first authentication vectors actually generated by the unified data management entity in the prior art can be avoided. For example, if the authentication entity requests a plurality of first authentication vectors, and an authentication algorithm selected by the unified data management entity is an extensible authentication protocol authentication and key agreement prime (EAP-AKA') algorithm, the unified data management entity generates only one first authentication vector at a time. As a result, a requirement of a quantity of first authentication vectors requested by the authentication entity cannot be satisfied.

In still another possible implementation, the unified data management entity 101 is configured to send an authentication information answer to the authentication entity 102 after determining, according to a locally configured security policy, that authentication confirmation is required, where the authentication information answer carries an authentication confirmation identifier, and the authentication confirmation identifier is used to indicate that authentication confirmation is required. For a description of the locally configured security policy, refer to a related description in the foregoing embodiment. Details are not described herein again.

The authentication entity 102 is configured to: receive the authentication information answer from the unified data entity and send an authentication initiation answer to a security anchor function entity, where the authentication initiation answer carries the authentication confirmation identifier.

The authentication entity 102 is further configured to: receive an authentication confirmation request from the security anchor function entity, and perform authentication confirmation on a terminal according to the authentication confirmation request.

In the authentication system provided in this embodiment of this application, after determining, according to the locally configured security policy, that authentication confirmation is required, the unified data management entity may send the authentication confirmation identifier to the security anchor function entity by using the authentication entity, where the authentication confirmation identifier is used to indicate that authentication confirmation is required. Further, the authentication entity may receive the authentication confirmation request from the security anchor function entity, and perform authentication confirmation on the terminal according to the authentication confirmation request. In this way, in a subsequent process in which the security anchor function entity requests to register with the unified data management entity and obtains user subscription data, even if the unified data management entity fails to obtain an authentication confirmation result, because the unified data management entity may learn of a network security status, the unified data management entity may choose to reject or accept a request based on the network security status. However, in the prior art, in a subsequent process in which the security anchor function entity requests to register with the unified data management entity and obtains user subscription data, when the unified data management entity fails to obtain an authentication confirmation result, because the unified data management entity does not know whether a network is secure, the unified data management entity may directly reject or accept a request, thereby affecting network security. For example, if the unified data management entity directly accepts the request, a malicious security anchor function entity may take advantage of this. For example, even if the security anchor function entity fails to authenticate the terminal or an authentication procedure between the security anchor function entity and the terminal never occurs, the security anchor function entity may also request to register with the unified data management entity at any time and obtain user subscription data, to gain trust from the unified data management entity. As a result, a billing discrepancy between a visited network and a home network may be caused. Alternatively, if the unified data management entity directly rejects the request, even if the terminal has been successfully authenticated in a service network in which the security anchor function entity is located, the terminal may never be able to successfully register with the service network in which the security anchor function entity is located. As a result, the terminal cannot access the service network in which the security anchor function entity is located. The effect is similar to a denial-of-service attack. In other words, based on this solution, the billing discrepancy between the visited network and the home network or the denial-of-service attack that may exist in the prior art can be avoided, thereby improving network security.

In one embodiment, the authentication system 10 shown in FIG. 1 may be applied to a 5G network and another further network. This is not specifically limited in this embodiment of the present invention.

Figure 2:
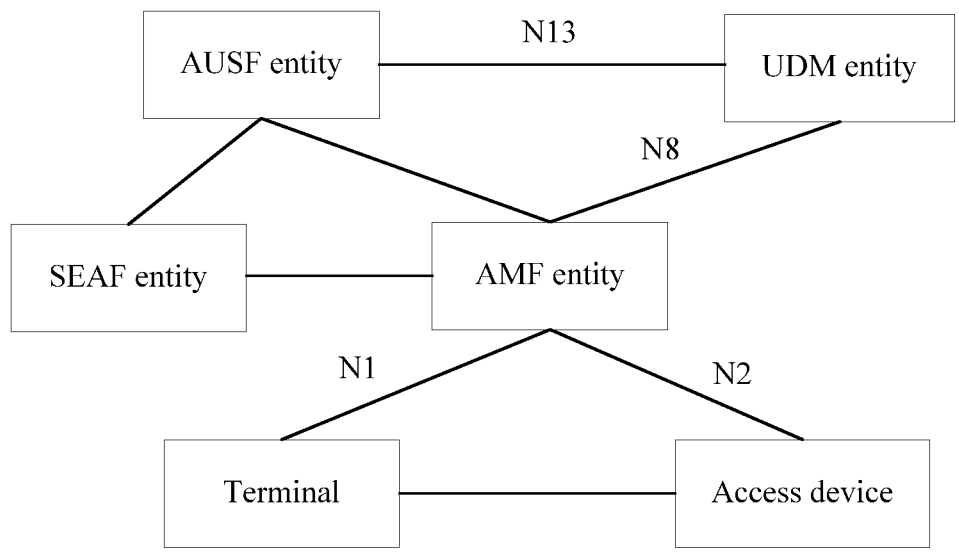
FIG. 2 is a schematic architectural diagram of a 5G network according to an embodiment of this application.

If the authentication system 10 shown in FIG. 1 is applied to the 5G network, as shown in FIG. 2, the authentication entity may be an AUSF entity in the 5G network, the unified data management entity may be a UDM entity in the 5G network, and the security anchor function entity may be a SEAF entity in the 5G network.

In addition, as shown in FIG. 2, the 5G network may further include an access device, an access and mobility management (core access and mobility management function, AMF) entity, and the like. This is not specifically limited in this embodiment of this application.

The 5G network may further include a policy control function (PCF) entity, a user plane function (UPF) entity, a session management function (SMF) entity, and the like although they are not shown. This is not specifically limited in this embodiment of this application.

It should be noted that, in this embodiment of this application, the SEAF entity and the AMF entity may be deployed together or deployed separately. This is not specifically limited in this embodiment of this application. An example in which the SEAF entity and the AMF entity are deployed separately is used for description in this embodiment of this application. Certainly, if the SEAF entity and the AMF entity are deployed together, the SEAF entity in this embodiment of this application needs to be replaced with the AMF entity. The description is provided herein, and is not described below again.

As shown in FIG. 2, a terminal communicates with the AMF entity through a next generation network (N) interface 1 (N1 for short), the access device communicates with the AMF entity through an N interface 2 (N2 for short), the AMF entity communicates with the UDM entity through an N interface 8 (N8 for short), the AUSF entity communicates with the UDM entity through an N interface 13 (N13 for short), and the SEAF entity may separately communicate with the AUSF entity and the AMF entity.

It should be noted that names of interfaces between various network elements in FIG. 2 are only examples, and the interfaces may have other names in specific implementation. This is not specifically limited in this embodiment of this application.

It should be noted that the access device, the SEAF entity, the AMF entity, the AUSF entity, the UDM entity, or the like in FIG. 2 is only a name, and the name constitutes no limitation on the device. In the 5G network and another further network, a network element or an entity corresponding to an access device, a SEAF entity, an AMF entity, an AUSF entity, or a UDM entity may have another name. This is not specifically limited in this embodiment of this application. For example, the UDM entity may be replaced with a home subscriber server (HSS), a user subscription database (USD), a database entity, a user data management entity, or the like. The description is provided herein, and is not described below again.

In one embodiment, the terminal in this embodiment of this application may include various handheld devices, vehicle-mounted devices, wearable devices, or computing devices that have a wireless communication function, or other processing devices connected to a wireless modem, and may further include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, user equipment (UE), a mobile station (MS), a terminal device, or the like. For ease of description, in this application, the devices mentioned above are collectively referred to as terminals.

In one embodiment, the access device in this embodiment of this application is a device that accesses a core network, for example, a base station, a broadband network gateway (BNG), an aggregation switch, a non-3rd generation partnership project (non-3GPP) access device, or the like. The base station may include base stations in various forms such as a macro base station, a micro base station (also referred to as a small cell), a relay station, and an access point.

In one embodiment, the unified data management entity 101 or the authentication entity 102 in FIG. 1 may be implemented by using one physical device, or may be implemented by using a plurality of physical devices together, or may be implemented by using a logical function module in a physical device. This is not specifically limited in this embodiment of this application.

Figure 3:
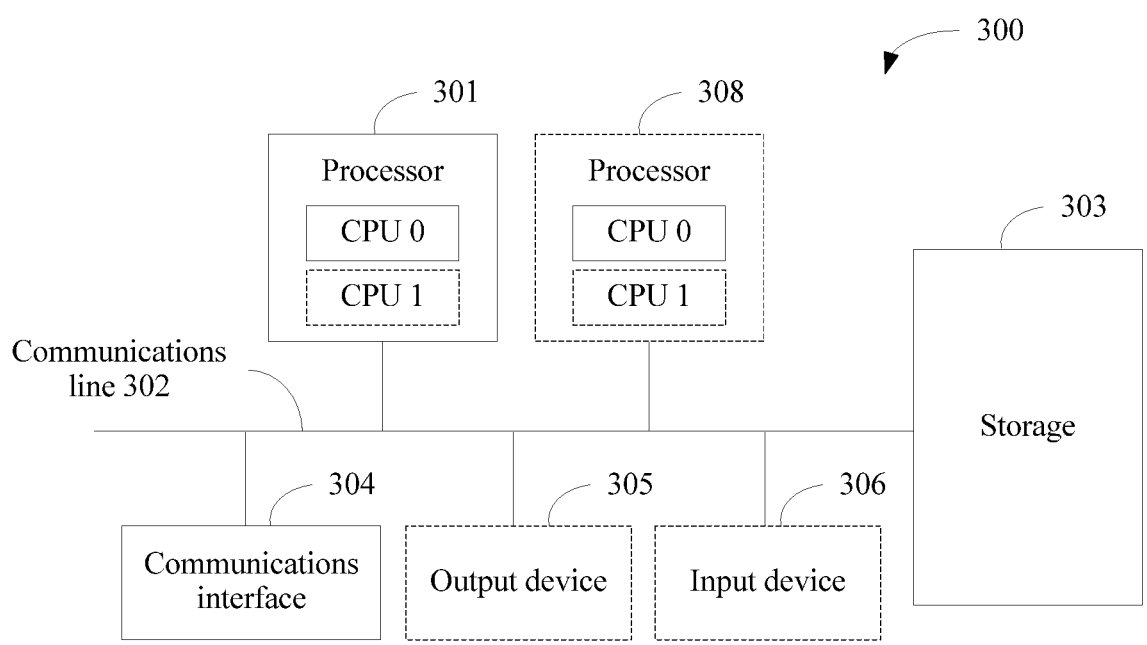
FIG. 3 is a schematic structural diagram of hardware of a communications device according to an embodiment of this application.

For example, the unified data management entity 101 or the authentication entity 102 in FIG. 1 may be implemented by using a communications device in FIG. 3. FIG. 3 is a schematic structural diagram of hardware of the communications device according to an embodiment of this application. The communications device 300 includes at least one processor 301, a communications line 302, a storage 303, and at least one communications interface 304.

The processor 301 may be a general-purpose central processing unit (CPU), a microprocessor, an application-specific integrated circuit (ASIC), or one or more integrated circuits for controlling program execution of the solutions of this application.

The communications line 302 may include a path transmitting information between the foregoing components.

The communications interface 304 is any apparatus such as a transceiver, and is configured to communicate with another device or a communications network such as Ethernet, a radio access network (RAN), or a wireless local area network (WLAN).

The storage 303 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium capable of carrying or storing expected program code in a form of instructions or data structures and capable of being accessed by a computer, but is not limited thereto. The storage may exist independently and is connected to the processor by using the communications line 302. The storage may be alternatively integrated with the processor.

The storage 303 is configured to store a computer executable instruction for executing the solutions of this application, and the processor 301 controls the execution. The processor 301 is configured to execute the computer executable instruction stored in the storage 303, to implement authentication methods provided in the following embodiments of this application.

In one embodiment, the computer executable instruction in this embodiment of this application may also be referred to as application program code. This is not specifically limited in this embodiment of this application.

In specific implementation, in an embodiment, the processor 301 may include one or more CPUs such as a CPU 0 and a CPU 1 in FIG. 3.

In specific implementation, in an embodiment, the communications device 300 may include a plurality of processors such as the processor 301 and a processor 308 in FIG. 3. Each of the processors may be a single-core (single-CPU) processor, or may be a multi-core (multi-CPU) processor. The processor herein may be one or more devices, circuits, and/or processing cores used for processing data (such as a computer program instruction).

In specific implementation, in an embodiment, the communications device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, or a projector. The input device 306 communicates with the processor 301, and may receive input from a user in a plurality of manners. For example, the input device 306 may be a mouse, a keyboard, a touchscreen device, or a sensing device.

The communications device 300 may be a general-purpose device or a dedicated device. In specific implementation, the communications device 300 may be a desktop computer, a portable computer, a network server, a personal digital assistant (PDA), a mobile phone, a tablet computer, a wireless terminal device, an embedded device, or a device with a structure similar to that in FIG. 3. A type of the communications device 300 is not limited in this embodiment of this application.

The following describes in detail the authentication methods provided in the embodiments of this application with reference to FIG. 1 to FIG. 3.

It should be noted that names of parameters or names of messages between various network elements in the following embodiments of this application are only examples, and may have other names in specific implementation. This is not specifically limited in this embodiment of this application.

It should be noted that, in addition to carrying described parameters, messages exchanged between various network elements in the following embodiments of this application may carry other parameters. This is not specifically limited in this embodiment of this application.

Figure 4:
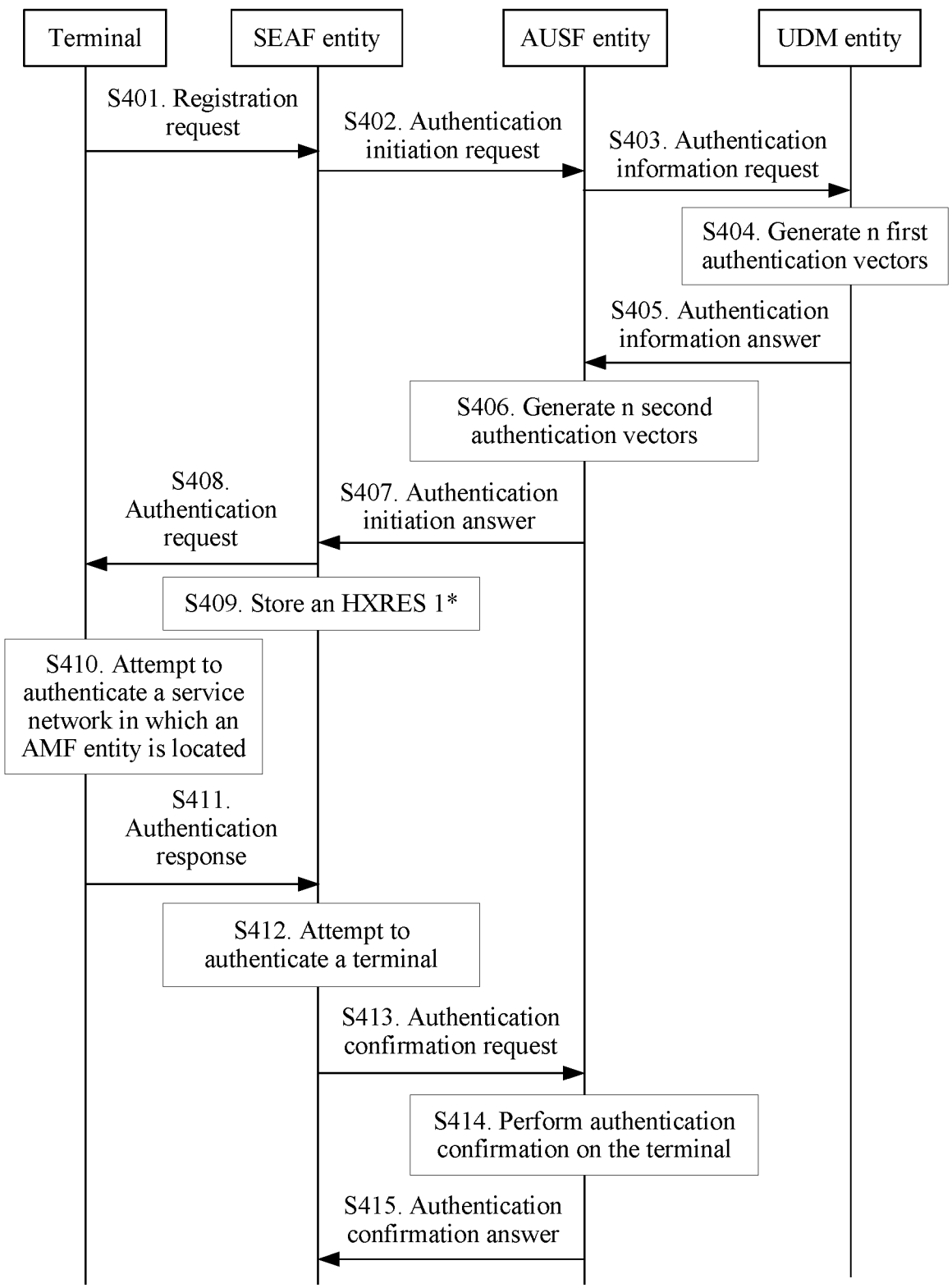
FIG. 4 is a first schematic flowchart of an authentication method according to an embodiment of this application.

For example, the authentication system shown in FIG. 1 is applied to the 5G network shown in FIG. 2. FIG. 4 shows an authentication method according to an embodiment of this application, and the authentication method includes the following operations.

Operation S401. A terminal sends a registration request to a SEAF entity, so that the SEAF entity receives the registration request from the terminal. The registration request carries a subscription identifier of a user.

In one embodiment, in this embodiment of this application, the subscription identifier of the user may be, for example, an international mobile subscriber identity (IMSI) or another identifier. This is not specifically limited in this embodiment of this application.

Operation S402. The SEAF entity sends an authentication initiation request to an AUSF entity, so that the AUSF entity receives the authentication initiation request from the SEAF entity. The authentication initiation request carries the subscription identifier of the user and an identifier of a service network in which the SEAF entity is located.

Operation S403. The AUSF entity sends an authentication information request to a UDM entity, so that the UDM entity receives the authentication information request from the AUSF entity. The authentication information request carries the subscription identifier of the user and the identifier of the service network in which the SEAF entity is located.

Operation S404. The UDM entity generates n first authentication vectors, where n is a positive integer.

In one embodiment, in this embodiment of this application, after receiving the authentication information request from the AUSF entity, the UDM entity may select an authentication algorithm based on a configuration, to generate a corresponding quantity of first authentication vectors based on the authentication algorithm. For example, if the authentication algorithm selected by the UDM entity is a 5G-AKA algorithm, the UDM entity may generate n first authentication vectors based on a default quantity n of authentication vectors that is locally configured; or if the authentication algorithm selected by the UDM entity is an EAP-AKA' algorithm, the UDM entity may generate only one first authentication vector.

For related implementation of selecting the authentication algorithm by the UDM entity based on the configuration, refer to an existing manner. Details are not described herein.

It should be noted that, in this embodiment of this application, for different authentication algorithms, default quantities n of authentication vectors that are locally configured by the UDM entity may be the same or may be different. This is not specifically limited in this embodiment of this application.

In this embodiment of this application, the UDM entity may generate the corresponding quantity of first authentication vectors based on the authentication algorithm, unlike in the prior art in which a quantity of authentication vectors is carried in an authentication information request sent by the AUSF entity to the UDM entity. Therefore, inconsistency between the quantity of first authentication vectors requested by the AUSF entity and a quantity of first authentication vectors generated by the UDM entity in the prior art can be avoided. For example, if the AUSF entity requests a plurality of first authentication vectors, and an authentication algorithm selected by the UDM entity is an EAP-AKA' algorithm, the UDM entity generates only one first authentication vector at a time. As a result, a requirement of a quantity of first authentication vectors requested by the authentication entity cannot be satisfied.

Operation S405. The UDM entity sends an authentication information answer to the AUSF entity, so that the AUSF entity receives the authentication information answer from the UDM entity. The authentication information answer carries the n first authentication vectors.

In one embodiment, in this embodiment of this application, the UDM entity may determine, according to a locally configured security policy, that authentication confirmation is required. For example, the UDM entity may determine, based on the carried identifier of the service network in which the SEAF entity is located in operation S403 and a security policy, in the locally configured security policy, of the service network in which the SEAF entity is located, whether authentication confirmation is required. If it is determined that authentication confirmation is required, an authentication confirmation identifier may be carried in the authentication information answer. The authentication confirmation identifier is used to indicate that authentication confirmation is required. In this case, after successfully authenticating the terminal subsequently, the SEAF entity may send an authentication confirmation request to the AUSF entity based on the authentication confirmation identifier, so that the AUSF entity further performs authentication confirmation on the terminal. If it is determined that no authentication confirmation is required, because the UDM entity may learn of a network security status, even if an authentication confirmation result cannot be obtained, a billing discrepancy between a visited network and a home network or a denial-of-service attack that may exist in the prior art can be avoided, thereby improving network security.

For example, if the security policy, in the locally configured security policy, of the service network in which the SEAF entity is located is that the service network has a low trust level, the UDM entity may determine that authentication confirmation is required, and add the authentication confirmation identifier to the authentication information answer; or if the security policy, in the locally configured security policy, of the service network in which the SEAF entity is located is that the service network has a high trust level, the UDM entity may determine that no authentication confirmation is required, and does not need to add the authentication confirmation identifier to the authentication information answer.

Operation S406. The AUSF entity generates n second authentication vectors based on the n first authentication vectors.

For specific implementation of operation S406, refer to an existing implementation. Details are not described herein.

Operation S407. The AUSF entity sends an authentication initiation answer to the SEAF entity, so that the SEAF entity receives the authentication initiation answer from the AUSF entity. The authentication initiation answer carries one of the n second authentication vectors.

In one embodiment, in this embodiment of this application, if the authentication information answer in operation S405 carries the authentication confirmation identifier, the authentication initiation answer in operation S407 further carries the authentication confirmation identifier. In this case, after successfully authenticating the terminal subsequently, the SEAF entity may send the authentication confirmation request to the AUSF entity based on the authentication confirmation identifier, so that the AUSF entity further performs authentication confirmation on the terminal.

In one embodiment, in this embodiment of this application, if the authentication information answer in operation S405 does not carry the authentication confirmation identifier, after receiving the authentication information answer from the UDM entity, the AUSF entity may determine, according to the locally configured security policy, whether authentication confirmation is required. For example, the AUSF entity may determine, based on the carried identifier of the service network in which the SEAF entity is located in operation S402 and the security policy, in the locally configured security policy, of the service network in which the SEAF entity is located, whether authentication confirmation is required. If it is determined that authentication confirmation is required, the authentication confirmation identifier may be further carried in the authentication initiation answer in operation S407. In this case, after successfully authenticating the terminal subsequently, the SEAF entity may send the authentication confirmation request to the AUSF entity based on the authentication confirmation identifier, so that the AUSF entity further performs authentication confirmation on the terminal.

For example, if the security policy, in the locally configured security policy, of the service network in which the SEAF entity is located is that the service network has a low trust level, the AUSF entity may determine that authentication confirmation is required, and add the authentication confirmation identifier to the authentication initiation answer; or if the security policy, in the locally configured security policy, of the service network in which the SEAF entity is located is that the service network has a high trust level, the UDM entity may determine that no authentication confirmation is required, and does not need to add the authentication confirmation identifier to the authentication initiation answer.

In one embodiment, in this embodiment of this application, if the SEAF entity determines, according to the locally configured security policy, that no authentication confirmation is required, it may indicate that the service network has a high trust level, and the AUSF entity may send the authentication initiation answer to the SEAF entity. The authentication initiation answer carries the n second authentication vectors. This is not specifically limited in this embodiment of this application. In this way, not only prior-art problems of performance and memory resource waste that may be caused by remaining n−1 unused first authentication vectors can be resolved, thereby improving efficiency of using the first authentication vector, but also failure to authenticate the terminal that is caused by failure of a link between the SEAF entity and the AUSF entity can be reduced, thereby improving reliability of an authentication result.

In one embodiment, in this embodiment of this application, it is assumed that the second authentication vector carried in the authentication initiation answer includes a RAND 1, an AUTN 1, an HXRES 1*, and a Kasme 1*, and a corresponding first authentication vector includes the RAND 1, the AUTN 1, an XRES 1*, and the Kasme 1*, the AUSF entity may further store a correspondence between the RAND 1 and the XRES 1* for use in a subsequent operation S414. This is not specifically limited in this embodiment of this application.

Operation S408. The SEAF entity sends an authentication request to the terminal, so that the terminal receives the authentication request from the SEAF entity. The authentication request carries a RAND 1 and an AUTN 1.

Operation S409. The SEAF entity stores, for use in a subsequent operation S412, an HXRES 1* in the second authentication vector carried in the authentication initiation answer, where details are not described herein.

It should be noted that, in this embodiment of this application, there is no necessary sequence between the operations S408 and S409. Operation S408 may be performed before S409; or operation S409 may be performed before S408; or the operations S408 and S409 may be performed simultaneously. This is not specifically limited in this embodiment of this application.

Operation S410. The terminal attempts to authenticate, based on the AUTN 1, the service network in which the SEAF entity is located, and calculates an RES* based on the RAND 1.

For specific implementation of operation S410, refer to an existing implementation. Details are not described herein.

Operation S411. The terminal sends an authentication response to the SEAF entity, so that the SEAF entity receives the authentication response from the terminal, where the authentication response carries the RES*.

In one embodiment, the authentication response may further carry, for use in the subsequent operation S414, the RAND 1 in the second authentication vector carried in the authentication initiation answer. Details are not described herein.

Operation S412. The SEAF entity attempts to authenticate the terminal.

In one embodiment, in this embodiment of this application, the SEAF entity may calculate an HRES* based on the RES* and an algorithm defined in the 3GPP 33.501 specification, and complete authentication on the terminal by comparing the HRES* with the HXRES 1* stored in operation S409. For example, if the HRES* and the HXRES 1* stored in operation S409 are equal, it may be determined that the authentication performed on the terminal succeeds; or if the HRES* and the HXRES 1* stored in operation S409 are unequal, it may be determined that the authentication performed on the terminal fails.

After successfully authenticating the terminal, the SEAF entity may perform the following operation S413 based on the authentication confirmation identifier carried in the authentication initiation answer in operation S407; or after successfully authenticating the terminal, the SEAF entity may directly perform the following operation S413. This is not specifically limited in this embodiment of this application.

Certainly, if the SEAF entity fails to authenticate the terminal, the SEAF entity may send a registration reject message to the terminal. This is not specifically limited in this embodiment of this application.

Operation S413. The SEAF entity sends an authentication confirmation request to the AUSF entity, so that the AUSF entity receives the authentication confirmation request from the SEAF entity. The authentication confirmation request carries the RES*.

In one embodiment, if the authentication response in operation S411 further carries the RAND 1, the authentication confirmation request in operation S413 further carries the RAND 1; or if the authentication response in operation S411 does not carry the RAND 1, the authentication confirmation request in operation S413 may further carry the RAND 1 in operation S407. This is not specifically limited in this embodiment of this application.

Operation S414. The AUSF entity performs authentication confirmation on the terminal.

In one embodiment, in this embodiment of this application, if the authentication confirmation request in operation S413 further carries the RAND 1, the AUSF entity may find the XRES 1* based on the RAND 1 and the prestored correspondence between the RAND 1 and the XRES 1*, and then complete authentication confirmation on the terminal by comparing the XRES 1* with the RES*. For example, if the XRES 1* and the RES* are equal, it may be determined that the authentication confirmation performed on the terminal succeeds; or if the XRES 1* and the RES* are unequal, it may be determined that the authentication confirmation performed on the terminal fails. In this manner, after the AUSF entity receives the authentication confirmation request from the SEAF entity, because the XRES 1* corresponding to the RES* can be quickly found, the following problem in the prior art can be resolved: During authentication confirmation, the AUSF entity cannot determine an authentication vector from a plurality of first authentication vectors previously received by the AUSF from the UDM entity, and therefore cannot use an XRES* in the authentication vector to compare with the received RES*, and as a result, processing performance of the AUSF entity is affected. Therefore, quick authentication confirmation can be performed on the terminal.

Operation S415. The AUSF entity sends an authentication confirmation answer to the SEAF entity, so that the SEAF entity receives the authentication confirmation answer from the AUSF entity.

When the authentication confirmation succeeds, the authentication confirmation answer carries the other n−1 unused second authentication vectors in the n second authentication vectors. In one embodiment, the authentication confirmation answer may further carry the foregoing authentication confirmation identifier. In this case, when the SEAF entity needs to attempt to authenticate the terminal again subsequently, the other n−1 unused second authentication vectors in the n second authentication vectors may be directly used. For example, after the SEAF entity receives a periodic registration request or tracking area update request from the terminal, the other n−1 unused second authentication vectors in the n second authentication vectors may be directly used, to attempt to authenticate the terminal by performing the operations S408 to S412, or attempt to authenticate the terminal by performing the operations S408 to S415, and then authentication confirmation is performed on the terminal. Details are not described in this embodiment of this application.

In one embodiment, in this embodiment of this application, when the authentication confirmation succeeds, the authentication confirmation answer may further carry some of the other n−1 unused second authentication vectors in the n second authentication vectors. In this case, when the SEAF entity needs to attempt to authenticate the terminal again subsequently, some of the second authentication vectors carried in the authentication confirmation answer may be directly used in the foregoing manner. This is not specifically limited in this embodiment of this application.

In one embodiment, when the authentication confirmation succeeds, the authentication confirmation answer may carry an authentication confirmation success indication, and the authentication confirmation success indication is used to indicate that the authentication confirmation succeeds, so that the SEAF entity can learn of an authentication confirmation result in a timely manner. The authentication confirmation success indication may be, for example, a success code in an authentication confirmation response. This is not specifically limited in this embodiment of this application.

When the authentication confirmation fails, the authentication confirmation answer may carry an authentication confirmation failure indication, and the authentication confirmation failure indication is used to indicate that the authentication confirmation fails, so that the SEAF entity can learn of an authentication confirmation result in a timely manner. The authentication confirmation failure indication may be, for example, a failure code in an authentication confirmation response. This is not specifically limited in this embodiment of this application.

In one embodiment, when the authentication confirmation fails, the authentication confirmation failure indication may be carried in a dedicated message instead of being carried in the authentication confirmation answer. This is not specifically limited in this embodiment of this application.

Based on this solution, not only prior-art problems of performance and memory resource waste that may be caused by remaining n−1 unused first authentication vectors can be resolved, thereby improving efficiency of using the first authentication vector, but also failure to authenticate the terminal that is caused by failure of a link between the SEAF entity and the AUSF entity can be reduced, thereby improving reliability of an authentication result.

The actions of the AUSF entity and the UDM entity in the foregoing operations S401 to S415 may be performed by the processor 301 in the communications device 300 shown in FIG. 3 by invoking the application program code stored in the storage 303. This is not limited in this embodiment of this application.

Figure 5:
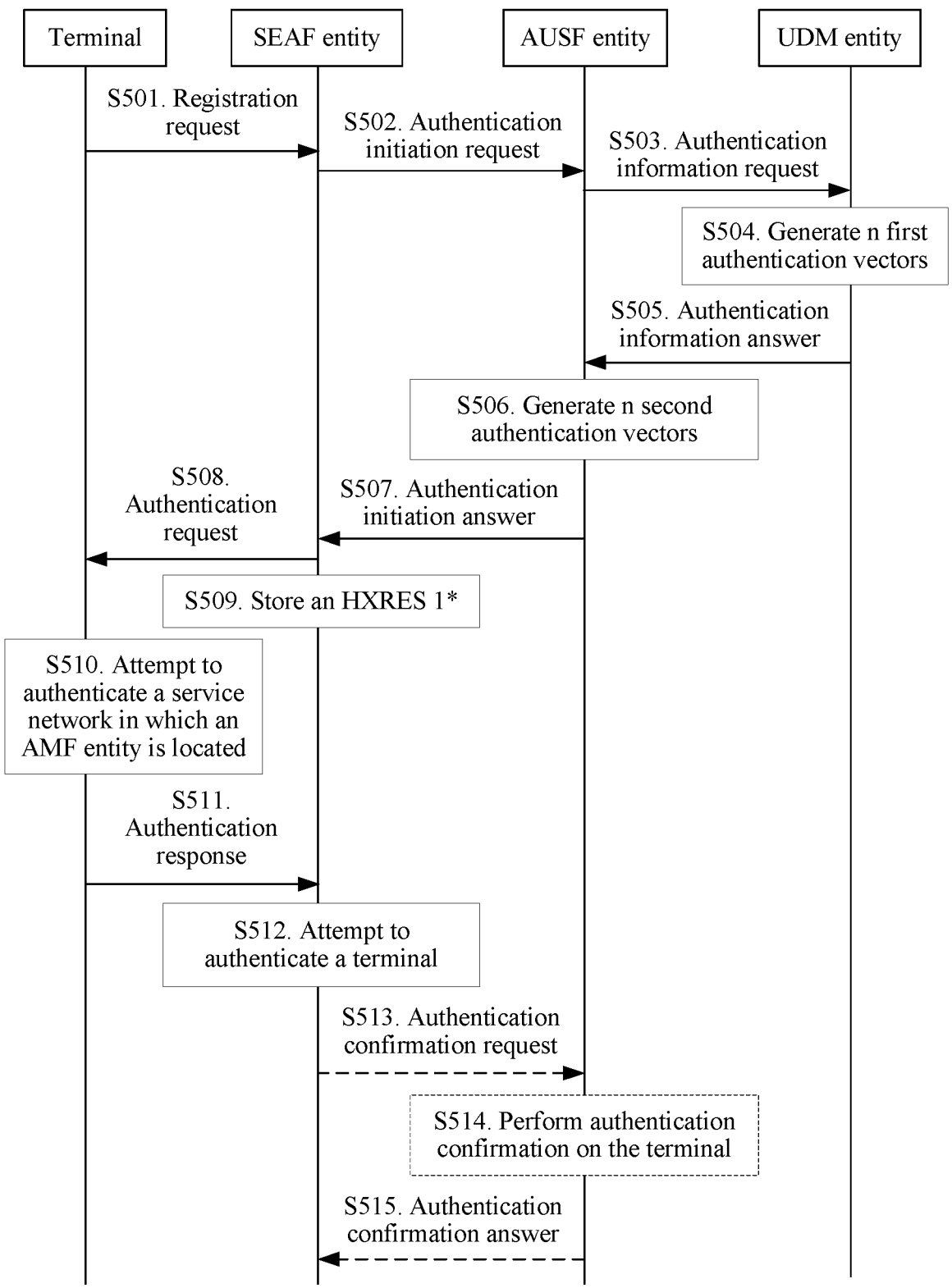
FIG. 5 is a second schematic flowchart of an authentication method according to an embodiment of this application.

In one embodiment, for example, the authentication system shown in FIG. 1 is applied to the 5G network shown in FIG. 2. FIG. 5 shows another authentication method according to an embodiment of this application, and the authentication method includes the following operations.

Operations S501 to S503 are the same as the operations S401 to S403. For details, refer to the embodiment shown in FIG. 4. Details are not described herein again.

Operation S504. The UDM entity generates n first authentication vectors according to a locally configured security policy, where n is a positive integer.

In one embodiment, in this embodiment of this application, the UDM entity may generate the n first authentication vectors based on the carried identifier of the service network in which the SEAF entity is located in operation S403 and a security policy, in the locally configured security policy, of the service network in which the SEAF entity is located.

For example, if the security policy, in the locally configured security policy, of the service network in which the SEAF entity is located is that the service network has a high trust level, the UDM entity may generate n first authentication vectors based on a default quantity n of authentication vectors that is locally configured; or if the security policy, in the locally configured security policy, of the service network in which the SEAF entity is located is that the service network has a low trust level, the UDM entity may generate one first authentication vector.

In one embodiment, in this embodiment of this application, the UDM entity may also determine a quantity of to-be-generated first authentication vectors based on a selected authentication algorithm. For example, if the selected authentication algorithm is a 5G-AKA algorithm, the UDM entity generates the n first authentication vectors based on the carried identifier of the service network in which the SEAF entity is located in operation S503 and the locally configured security policy, where n is a positive integer; or if the selected authentication algorithm is an EAP-AKA' algorithm, the UDM entity may generate only one first authentication vector. This is not specifically limited in this embodiment of this application.

Operations S505 and S506 are the same as the operations S405 and S406. For details, refer to the embodiment shown in FIG. 4. Details are not described herein again.

Operation S507 is similar to operation S407. A difference lies only in that, in the embodiment shown in FIG. 4, the authentication initiation answer carries one of the n second authentication vectors, but in this embodiment of this application, because the n first authentication vectors are generated by the UDM entity according to the locally configured security policy, the authentication initiation answer may carry the n second authentication vectors. For a related description, refer to the embodiment shown in FIG. 4. Details are not described herein again.

It is assumed that a second authentication vector to be subsequently used includes a RAND 1, an AUTN 1, an HXRES 1*, and a Kasme 1*, the authentication method provided in this embodiment of this application further includes the following operations.

Operations S508 to S512 are the same as the operations S408 to S412. For details, refer to the embodiment shown in FIG. 4. Details are not described herein again.

In one embodiment, this embodiment of this application may further include the following operations.

Operations S513 and S514 are the same as operations S413 and S414. For details, refer to the embodiment shown in FIG. 4. Details are not described herein again.

Operation S515 is similar to operation S415. A difference lies only in that, in the embodiment shown in FIG. 4, when the authentication confirmation succeeds, the authentication confirmation answer carries the other n−1 unused second authentication vectors in the n second authentication vectors, but in this embodiment of this application, because the n second authentication vectors have been sent to the SEAF entity in operation S407, the other n−1 unused second authentication vectors in the n second authentication vectors do not need to be carried in the authentication confirmation answer. For a related description, refer to the embodiment shown in FIG. 4. Details are not described herein again.

Based on the authentication method provided in this embodiment of this application, not only prior-art problems of performance and memory resource waste that may be caused by remaining n−1 unused first authentication vectors can be resolved, thereby improving efficiency of using the first authentication vector, but also failure to authenticate the terminal that is caused by failure of a link between the SEAF entity and the AUSF entity can be reduced, thereby improving reliability of an authentication result. In addition, inconsistency between a quantity of first authentication vectors requested by the AUSF and a quantity of first authentication vectors actually generated by the UDM entity in the prior art can be avoided.

The actions of the AUSF entity and the UDM entity in the foregoing operations S501 to S515 may be performed by the processor 301 in the communications device 300 shown in FIG. 3 by invoking the application program code stored in the storage 303. This is not limited in this embodiment of this application.

In one embodiment, for example, the authentication system shown in FIG. 1 is applied to the 5G network shown in FIG. 2. An embodiment of this application further provides an authentication method. In the authentication method, after receiving authentication information from an AUSF entity, a UDM entity determines, according to a locally configured security policy, that authentication confirmation is required, and further sends an authentication information answer to the AUSF entity. The authentication information answer carries an authentication confirmation identifier, and the authentication confirmation identifier is used to indicate that authentication confirmation is required. After receiving the authentication information answer from the UDM entity, the AUSF entity sends an authentication initiation answer to a SEAF entity. The authentication initiation answer carries the authentication confirmation identifier. In this case, after successfully authenticating a terminal subsequently, the SEAF entity may send an authentication confirmation request to the AUSF entity, so that the AUSF entity performs authentication confirmation on the terminal according to the authentication confirmation request after receiving the authentication confirmation request from the SEAF entity. In the authentication method, n first authentication vectors may be generated and n second authentication vectors may be sent in the manner in the embodiment shown in FIG. 4; or n first authentication vectors may be generated and n second authentication vectors may be sent in the manner in the embodiment shown in FIG. 5. This is not specifically limited in this embodiment of this application. For a related description, refer to the embodiment shown in FIG. 4 or FIG. 5. Details are not described herein again.

Based on the authentication method provided in this embodiment of this application, a billing discrepancy between a visited network and a home network or a denial-of-service attack that may exist in the prior art can be avoided, thereby improving network security.

The foregoing mainly describes the solutions provided in the embodiments of this application from a perspective of interaction between network elements. It may be understood that the foregoing authentication entity includes a corresponding hardware structure and/or software module for performing each function to implement the functions. A person of ordinary skill in the art should be easily aware that, units and algorithm operations in the examples described with reference to the embodiments disclosed in this specification may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the authentication entity may be divided into function modules based on the foregoing method examples. For example, various function modules may be obtained through division based on corresponding functions, or two or more functions may be integrated into one processing module. The integrated module may be implemented in a form of hardware, or may be implemented in a form of a software functional module. It should be noted that division of modules in the embodiments of this application is an example, and is merely logical function division. In actual implementation, another division manner may be used.

Figure 6:
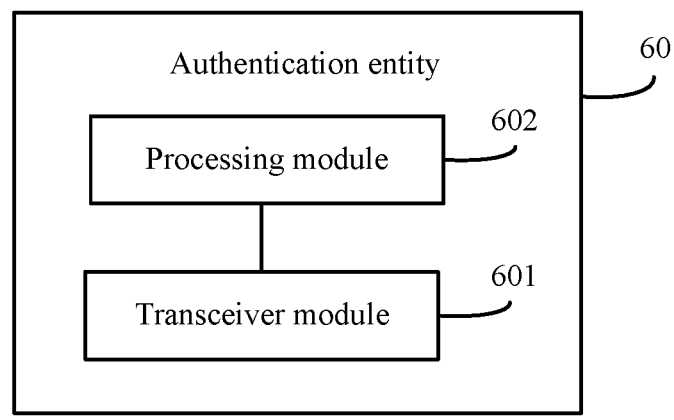
FIG. 6 is a schematic structural diagram of an authentication entity according to an embodiment of this application.

For example, when various function modules are obtained through integration, FIG. 6 is a schematic structural diagram of an authentication entity 60. The authentication entity 60 includes a transceiver module 601 and a processing module 602. The transceiver module 601 is configured to receive n first authentication vectors from a unified data management entity, where n is a positive integer. The processing module 602 is configured to generate n second authentication vectors based on the n first authentication vectors. The transceiver module 601 is further configured to send one of the n second authentication vectors to a security anchor function entity. The transceiver module 601 is further configured to: receive an authentication confirmation request from the security anchor function entity, and perform authentication confirmation on a terminal according to the authentication confirmation request. The transceiver module 601 is further configured to send the other n−1 unused second authentication vectors in the n second authentication vectors to the security anchor function entity when the authentication confirmation succeeds.

In one embodiment, the transceiver module 601 is further configured to send an authentication confirmation identifier to the security anchor function entity, where the authentication confirmation identifier is used to indicate that authentication confirmation is required.

In one embodiment, the processing module 602 is further configured to determine that authentication confirmation is required.

In a possible implementation, that the processing module 602 is configured to determine that authentication confirmation is required includes: the processing module 602 is configured to receive the authentication confirmation identifier from the unified data management entity, where the authentication confirmation identifier is used to indicate that authentication confirmation is required.

In a possible implementation, that the processing module 602 is configured to determine that authentication confirmation is required includes: the processing module 602 is configured to determine, according to a locally configured security policy, that authentication confirmation is required.

In one embodiment, the authentication confirmation request carries an RES* and a corresponding RAND. That the processing module 602 is configured to perform authentication confirmation on the terminal according to the authentication confirmation request includes: the processing module 602 is configured to: search for a corresponding XRES* based on the RAND, and perform authentication confirmation on the terminal by comparing the RES* with the XRES*.

In one embodiment, the transceiver module 601 is further configured to send an authentication confirmation failure indication to the security anchor function entity when the authentication confirmation fails, where the authentication confirmation failure indication is used to indicate that the authentication confirmation fails.

In one embodiment, the transceiver module 601 is further configured to send an authentication confirmation success indication to the security anchor function entity when the authentication confirmation succeeds, where the authentication confirmation success indication is used to indicate that the authentication confirmation succeeds.

In one embodiment, the transceiver module 601 is further configured to send the authentication confirmation identifier to the security anchor function entity when the authentication confirmation succeeds, where the authentication confirmation identifier is used to indicate that authentication confirmation is required.

All related content of operations in the foregoing method embodiments may be cited in function descriptions of corresponding function modules. Details are not described herein again.

In this embodiment, the authentication entity 60 is presented in a form of function modules obtained through integration. The "module" herein may be an application-specific integrated circuit (ASIC), a circuit, a processor and a storage that execute one or more software or firmware programs, an integrated logic circuit, and/or another device that can provide the foregoing functions. In a simple embodiment, a person skilled in the art may figure out that the form shown in FIG. 3 may be used for the authentication entity 60.

For example, the processor 301 in FIG. 3 may invoke the computer executable instruction stored in the storage 303, so that the authentication entity 60 performs the authentication method in the foregoing method embodiment.

Specifically, the functions/implementation processes of the transceiver module 601 and the processing module 602 in FIG. 6 may be implemented by the processor 301 in FIG. 3 by invoking the computer executable instruction stored in the storage 303. Alternatively, the function/implementation process of the processing module 602 in FIG. 6 may be implemented by the processor 301 in FIG. 3 by invoking the computer executable instruction stored in the storage 303, and the function/implementation process of the transceiver module 601 in FIG. 6 may be implemented by the communications interface 304 in FIG. 3.

Because the authentication entity provided in this embodiment of this application may be configured to perform the foregoing authentication method, for a technical effect that can be obtained by the authentication entity, refer to the foregoing method embodiment. Details are not described herein again.

In the foregoing embodiment, the authentication entity 60 is presented in a form of function modules obtained through integration. Certainly, the function modules of the authentication entity may be obtained through division based on corresponding functions in the embodiments of this application. This is not specifically limited in this embodiment of this application.

In one embodiment, an embodiment of this application provides a chip system, and the chip system includes a processor, configured to support an authentication entity in implementing the foregoing authentication method, for example, generating n second authentication vectors based on n first authentication vectors. In one embodiment, the chip system further includes a storage. The storage is configured to store a program instruction and data required by the authentication entity. The chip system may include a chip, or may include a chip and another discrete device. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions in the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another operation, and "a" or "one" does not exclude a case of "a plurality of". A single processor or another single unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example descriptions of this application defined by the accompanying claims, and are considered to cover any or all of modifications, variations, combinations, or equivalents that cover the scope of this application. Obviously, a person skilled in the art can make various modifications and variations to this application without departing from the spirit and scope of this application. In this way, this application is intended to cover these modifications and variations of this application provided that they fall within the scope of protection defined by the following claims and their equivalent technologies of this application.

What is claimed is:

1. An authentication method, wherein the method comprises:
    receiving, by an authentication entity in a home network, a first authentication vector from a unified data management entity;
    generating, by the authentication entity, a second authentication vector based on the first authentication vector;
    sending, by the authentication entity, the second authentication vector to a security anchor function entity in a visited network;
    receiving, by the authentication entity, an authentication confirmation request from the security anchor function entity, and performing an authentication confirmation on a terminal according to the authentication confirmation request; and
    sending, by the authentication entity, an authentication confirmation success indication to the security anchor function entity if the authentication confirmation succeeds, wherein the authentication confirmation success indication is used to indicate that the authentication confirmation succeeds; or sending, by the authentication entity, an authentication confirmation failure indication to the security anchor function entity if the authentication confirmation fails, wherein the authentication confirmation failure indication is used to indicate that the authentication confirmation fails;
    wherein the authentication entity is an authentication server function (AUSF) entity.

2. The method according to claim 1, wherein the method further comprises:
    sending, by the authentication entity, an authentication confirmation identifier to the security anchor function entity, wherein the authentication confirmation identifier is used to indicate that an authentication confirmation is required.

3. The method according to claim 1, wherein the method further comprises:
    determining, by the authentication entity, that an authentication confirmation is required.

4. The method according to claim 3, wherein the determining, by the authentication entity, that an authentication confirmation is required comprises:
    receiving, by the authentication entity, an authentication confirmation identifier from the unified data management entity, wherein the authentication confirmation identifier is used to indicate that an authentication confirmation is required.

5. The method according to claim 3, wherein the determining, by the authentication entity, that an authentication confirmation is required comprises:
    determining, by the authentication entity according to a locally configured security policy, that an authentication confirmation is required.

6. The method according to claim 1, wherein the first authentication vector is generated using an extensible authentication protocol authentication and key agreement prime.

7. The method according to claim 1, wherein the authentication confirmation request carries a response (RES*) and a corresponding random number (RAND); and
    the performing, by the authentication entity, the authentication confirmation on the terminal according to the authentication confirmation request comprises:
    searching, by the authentication entity, for a corresponding expected response (XRES*) based on the RAND, and performing the authentication confirmation on the terminal by comparing the RES* with the XRES*.

8. The method according to claim 1, wherein after the performing, by the authentication entity, the authentication confirmation on the terminal according to the authentication confirmation request, the method further comprises:
    sending, by the authentication entity, an authentication confirmation identifier to the security anchor function entity if the authentication confirmation succeeds, wherein the authentication confirmation identifier is used to indicate that an authentication confirmation is required.

9. An authentication entity, wherein the authentication entity comprises a transceiver and a processor, wherein
the transceiver is configured to receive a first authentication vector from a unified data management entity;
the processor is configured to: generate a second authentication vector based on the first authentication vector;
the transceiver is further configured to: send the second authentication vector to a security anchor function entity in a visited network;
receive an authentication confirmation request from the security anchor function entity; and perform an authentication confirmation on a terminal according to the authentication confirmation request; and
the transceiver is further configured to: send an authentication confirmation success indication to the security anchor function entity if the authentication confirmation succeeds, wherein the authentication confirmation success indication is used to indicate that the authentication confirmation succeeds; or send an authentication confirmation failure indication to the security anchor function entity if the authentication confirmation fails, wherein the authentication confirmation failure indication is used to indicate that the authentication confirmation fails;
wherein the authentication entity is an authentication server function (AUSF) entity.

10. The authentication entity according to claim 9, wherein the transceiver is further configured to send an authentication confirmation identifier to the security anchor function entity, wherein the authentication confirmation identifier is used to indicate that an authentication confirmation is required.

11. The authentication entity according to claim 9, wherein the processor of the authentication entity is further configured to determine that an authentication confirmation is required.

12. The authentication entity according to claim 11, wherein that the processor is configured to determine that an authentication confirmation is required comprises:
the processor is configured to receive an authentication confirmation identifier from the unified data management entity, wherein the authentication confirmation identifier is used to indicate that an authentication confirmation is required.

13. The authentication entity according to claim 11, wherein that the processor is configured to determine that an authentication confirmation is required comprises:
the processor is configured to determine, according to a locally configured security policy, that an authentication confirmation is required.

14. The authentication entity according to claim 9, wherein the authentication confirmation request carries a response (RES*) and a corresponding random number (RAND); and
that the processor is configured to perform the authentication confirmation on the terminal according to the authentication confirmation request comprises:
the processor is configured to: search for a corresponding expected response (XRES*) based on the RAND, and perform the authentication confirmation on the terminal by comparing the RES* with the XRES*.

15. The authentication entity according to claim 9, wherein the transceiver is further configured to send an authentication confirmation identifier to the security anchor function entity if the authentication confirmation succeeds, wherein the authentication confirmation identifier is used to indicate that an authentication confirmation is required.

16. An authentication system, wherein the authentication system comprises an authentication entity in a home network and a security anchor function entity in a visited network, wherein
the authentication entity is configured to: receive a first authentication vector from a unified data management entity, and generate a second authentication vector based on the first authentication vector; send the second authentication vector to the security anchor function entity;
the security anchor function entity is configured to: receive the second authentication vector from the authentication entity; send an authentication confirmation request to the authentication entity;
the authentication entity is further configured to: receive the authentication confirmation request from the security anchor function entity, and perform authentication confirmation on a terminal according to the authentication confirmation request; and
the authentication entity is further configured to: send an authentication confirmation success indication to the security anchor function entity when an authentication confirmation succeeds, wherein the authentication confirmation success indication is used to indicate that the authentication confirmation succeeds; or send an authentication confirmation failure indication to the security anchor function entity when the authentication confirmation fails, wherein the authentication confirmation failure indication is used to indicate that the authentication confirmation fails;
wherein the authentication entity is an authentication server function (AUSF) entity.

17. An authentication method, comprising:
receiving, by an authentication entity in a home network, a first authentication vector from a unified data management entity;
generating, by the authentication entity, a second authentication vector based on the first authentication vector;
sending, by the authentication entity, the second authentication vector to a security anchor function entity in a visited network;
receiving, by the security anchor function entity, the second authentication vector from the authentication entity; sending, an authentication confirmation request to the authentication entity;
receiving, by the authentication entity, the authentication confirmation request from the security anchor function entity, and performing an authentication confirmation on a terminal according to the authentication confirmation request; and
sending, by the authentication entity, an authentication confirmation success indication to the security anchor function entity if the authentication confirmation succeeds, wherein the authentication confirmation success indication is used to indicate that the authentication confirmation succeeds; or sending, by the authentication entity, an authentication confirmation failure indication to the security anchor function entity if the authentication confirmation fails, wherein the authentication confirmation failure indication is used to indicate that the authentication confirmation fails;
wherein the authentication entity is an authentication server function (AUSF) entity, the unified data management entity is an unified data management (UDM)

entity, and the security anchor function entity is a security anchor function (SEAF) entity.

\* \* \* \* \*